United States Patent
Tsai et al.

(10) Patent No.: US 8,842,678 B2
(45) Date of Patent: Sep. 23, 2014

(54) MOBILE COMMUNICATION DEVICE AND COMMUNICATIVE TRANSMISSION METHOD

(75) Inventors: Ming-Han Tsai, Taoyuan (TW); Hsin-Ti Chueh, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 199 days.

(21) Appl. No.: 13/117,337

(22) Filed: May 27, 2011

(65) Prior Publication Data

US 2012/0051276 A1 Mar. 1, 2012

Related U.S. Application Data

(60) Provisional application No. 61/377,794, filed on Aug. 27, 2010.

(51) Int. Cl.
*H04L 12/28* (2006.01)
*H04W 52/02* (2009.01)

(52) U.S. Cl.
CPC .................................. *H04W 52/0216* (2013.01)
USPC .................................................. 370/395.54

(58) Field of Classification Search
CPC ..................... H04L 12/4641; H04L 29/12028; H04L 61/103; H04L 61/2015; H04L 63/08
See application file for complete search history.

(56) References Cited

U.S. PATENT DOCUMENTS

| | | | |
|---|---|---|---|
| 5,889,770 A | 3/1999 | Jokiaho et al. | |
| 2004/0054799 A1 | 3/2004 | Meier et al. | |
| 2006/0062190 A1* | 3/2006 | Suga | 370/338 |
| 2009/0161600 A1* | 6/2009 | Sato et al. | 370/328 |

FOREIGN PATENT DOCUMENTS

| | | |
|---|---|---|
| CN | 1627766 A | 6/2005 |
| CN | 101207501 A | 6/2008 |
| EP | 0754395 B1 | 1/1997 |
| TW | 200746675 | 12/2007 |
| WO | 2009148275 A2 | 12/2009 |

OTHER PUBLICATIONS

English translation of abstract of CN 101207501 A (published Jun. 25, 2008).
English translation of abstract of EP 0754395 B1 (published Jan. 22, 1997).
English translation of abstract of WO 2009148275 A2 (published Dec. 10, 2009).
English translation of abstract of CN 1627766 A (published Jun. 15, 2005).
Haijin Yan et al.; "Client-Centered, Energy-Efficient Wireless Communication on IEEE 802.11b Networks" IEEE Transactions on Mobile Computing, vol. 5, No. 11, Nov. 2006.
Taiwan Notice of Allowance dated Jun. 26, 2014.

* cited by examiner

*Primary Examiner* — Yong Zhou
(74) *Attorney, Agent, or Firm* — McClure, Qualey & Rodack, LLP

(57) ABSTRACT

The invention discloses a mobile communication device and a communicative transmission method thereof. The mobile communication device includes a communication module and a control unit. The communication module is used for communicatively connecting to a communication server. The control unit is coupled to the communication module. The control unit utilizes the communication module to receive a one-to-one packet from the communication server according to a first period, and ignore a one-to-many packet on the communication server. The control unit utilizes the communication module to transmit a second one-to-many packet to the communication server according to a second period.

16 Claims, 4 Drawing Sheets

MOBILE COMMUNICATION DEVICE AND COMMUNICATIVE TRANSMISSION METHOD

RELATED APPLICATIONS

This application claims priority to U.S. Provisional Application Ser. No. 61/377,794, filed Aug. 27, 2010, which is herein incorporated by reference.

BACKGROUND

1. Field of Invention

The present invention relates to a communication device. More particularly, the present invention relates to a mobile communication device and a communicative transmission method thereof.

2. Description of Related Art

Recently, the mobile communication device has become a necessary in our daily life, e.g. cellar phone, personal digital assistant, tablet computer, internet computer, notebook computer, etc. With the rocketing development of the digital communication technology, users usually utilize mobile communication device to browse websites, share files, or send multimedia messages through a mobile network or a wireless communication system.

Because there are more and more functions implemented on a modern mobile communication device, the loading of computing and processing on the mobile communication device becomes heavier. Therefore, the power consumption of the mobile communication device is larger, and a battery with larger capacity is needed for maintaining the duration of the mobile communication device. Besides, what users want is a compact, portable and light weighted mobile device. Therefore, the weight and size of the battery is limited. Accordingly, manufactures must try hard to provide an energy-saving and fully-functioned mobile communication device.

A traditional mobile communication device utilizes a communication module (e.g. a wireless network chip and/or a mobile communication chip) to form a communicative connection to a communication server (e.g. a mobile communication station, a wireless network station or a wireless network router). In traditional network structure, the communication server and each mobile communication device under the same domain will exchange messages between each others periodically, so as to ensure usability of the communication connection.

Please refer to FIG. 1. FIG. 1 illustrates a traditional communication network structure 100. The communication network structure 100 in FIG. 1 includes a communication server 102, a mobile communication device 104, a communication device 106, a mobile communication device 108 and a mobile communication device 110. In the example illustrated in FIG. 1, the communication server 102 can be a wireless Access Point (AP), and the mobile communication devices 104~110 can be electronic products, e.g. tablet computer, mobile phone, smart phone, etc.

Take an application between the communication server 102 and the mobile communication devices 104 for example, the mobile communication devices 104 under the traditional communication network structure 100 is configured to activate its communication module to receive a one-to-one packet from the communication server 102 every a constant period. The one-to-one packet can be a Beacon packet between the communication server 102 and the mobile communication devices 104, for ensuring the usability of the communication connection between the communication server 102 and the mobile communication devices 104.

Besides, in order to ensure that the mobile communication device 104, the communication device 106, the mobile communication device 108 and the mobile communication device 110 acknowledge the existences of each others for establishing the local area network among them, the mobile communication devices may transmit some one-to-many packets based on a specific network protocol for confirming their network configurations, when a new communication device joins the network or a network configuration needs to be updated. In an example, the communication device 106 may transmit a multicast packet via forwarding operation on the communication server 102 to the mobile communication devices 104 and 108; or in another example, the communication device 106 may transmit a broadcast packet via forwarding operation on the communication server 102 to all of the other mobile communication devices (including mobile communication devices 104, 108 and 110 in this case) under the same network domain.

Therefore, when the mobile communication device 104 is communicatively connected to the communication server 102 for receiving the one-to-one packet, the mobile communication device 104 will be continually power on its communication module if there is a one-to-many packet to be received, until the connection is over-timed or the one-to-many packet generated by other communication device is fully received. In this case, the mobile communication device 104 will continually power on the communication module for a long time, wherein the communication module is a component with high power consumption. Powering on the communication module for a long time may reduce the durability of the mobile communication device.

SUMMARY

In order to solve the aforesaid problem, this disclosure discloses a mobile communication device and a communicative transmission method thereof. The mobile communication device periodically receives one-to-one packets from the communication server and ignores one-to-many packets (e.g. Address Resolution Protocol request packets). Besides, the mobile communication device may periodically transmit one-to-many packets (e.g. Address Resolution Protocol response packets) to the communication server. Because the mobile communication device in this case does not need to receive or wait the one-to-many packets from other devices, the active time of the communication module in the mobile communication device can be shorten, so as to save energy and prolong the battery durability of the mobile communication device.

Therefore, an aspect of the invention is to provide a mobile communication device, which includes a communication module and a control unit. The communication module is used for communicatively connecting to a communication server. The control unit is coupled with the communication module. The control unit utilizes the communication module to receive a one-to-one packet from the communication server according to a first period and ignore a first one-to-many packet on the communication server. The control unit utilizes the communication module to transmit a second one-to-many packet to the communication server according to a second period.

According to an embodiment of the invention, the first one-to-many packet is a multicast packet or a broadcast packet.

According to an embodiment of the invention, the first one-to-many packet may include an Address Resolution Protocol (ARP) request packet. In this embodiment, the ARP request packet may come from another communication device communicatively connected with the communication server.

According to an embodiment of the invention, the second one-to-many packet is a multicast packet or a broadcast packet. In this embodiment, the second one-to-many packet may include an Address Resolution Protocol (ARP) response packet.

According to an embodiment of the invention, the mobile communication device transmits the second one-to-many packet via forwarding operation on the communication server to another communication device communicatively connected with the communication server.

According to an embodiment of the invention, the communication server is a wireless access point, and the one-to-one packet comprises a beacon packet corresponding to the wireless access point. In this embodiment, contents of the beacon packet may include a service set identifier (SSID), a supportable transmission speed and a Media Access Control (MAC) address of the wireless access point.

According to an embodiment of the invention, the second period is longer than the first period.

Another aspect of the invention is to provide a communicative transmission method, which can be used by a mobile communication device connecting to a communication server. The communicative transmission method includes steps of: receiving a one-to-one packet from the communication server according to a first period; ignoring a first one-to-many packet on the communication server; and, transmitting a second one-to-many packet to the communication server according to a second period.

According to an embodiment of the invention, the first one-to-many packet is a multicast packet or a broadcast packet.

According to an embodiment of the invention, the first one-to-many packet may include an Address Resolution Protocol (ARP) request packet. In this embodiment, the ARP request packet may come from another communication device communicatively connected with the communication server.

According to an embodiment of the invention, the second one-to-many packet is a multicast packet or a broadcast packet. In this embodiment, the second one-to-many packet may include an Address Resolution Protocol (ARP) response packet.

According to an embodiment of the invention, the mobile communication device transmits the second one-to-many packet via forwarding operation on the communication server to another communication device communicatively connected with the communication server.

According to an embodiment of the invention, the communication server is a wireless access point, and the one-to-one packet comprises a beacon packet corresponding to the wireless access point. In this embodiment, contents of the beacon packet may include a service set identifier (SSID), a supportable transmission speed and a Media Access Control (MAC) address of the wireless access point.

According to an embodiment of the invention, the second period is longer than the first period.

BRIEF DESCRIPTION OF THE DRAWINGS

The invention can be more fully understood by reading the following detailed description of the embodiment, with reference made to the accompanying drawings as follows.

DETAILED DESCRIPTION

In the invention, the mobile communication device periodically receives one-to-one packets from the communication server and ignores one-to-many packets (e.g. Address Resolution Protocol request packets). Besides, the mobile communication device may periodically transmit one-to-many packets (e.g. Address Resolution Protocol response packets) to the communication server. Because the mobile communication device in this case does not need to receive or wait the one-to-many packets from other devices, the active time of the communication module in the mobile communication device can be shorten, so as to save energy and prolong the battery durability of the mobile communication device.

Figure 1:
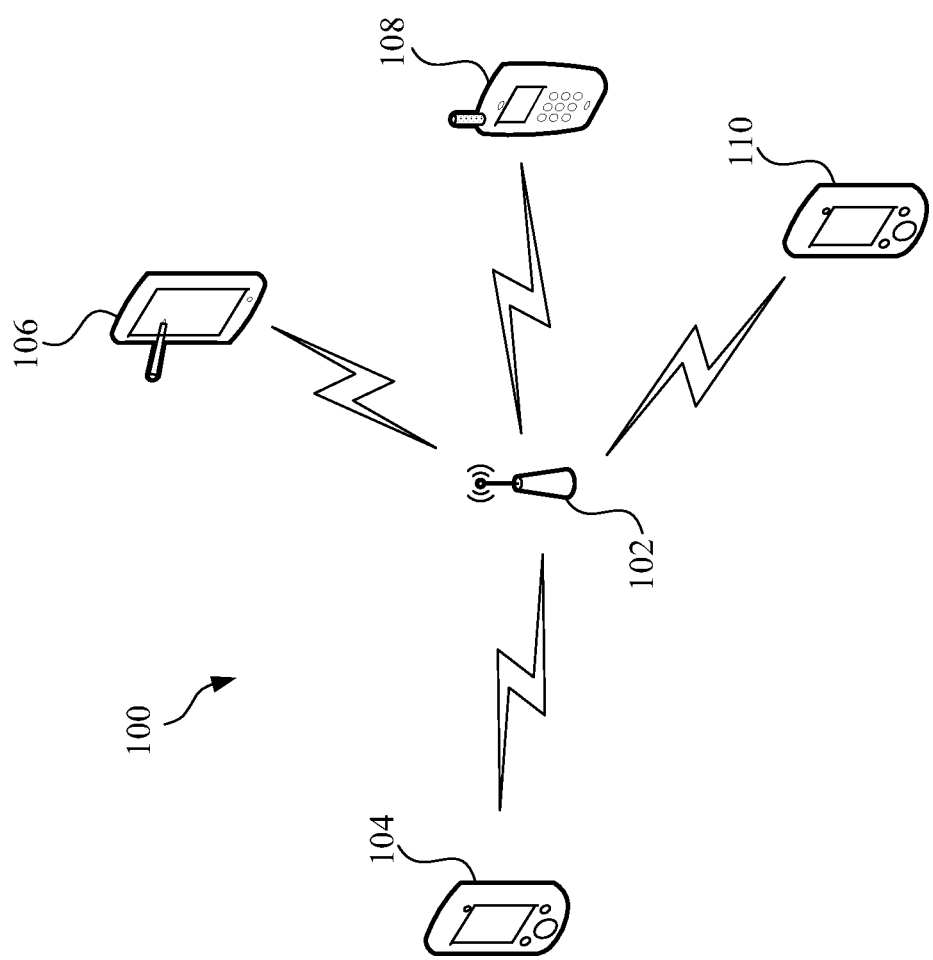
FIG. 1 is a schematic diagram illustrating a traditional communication network structure.
Figure 2:
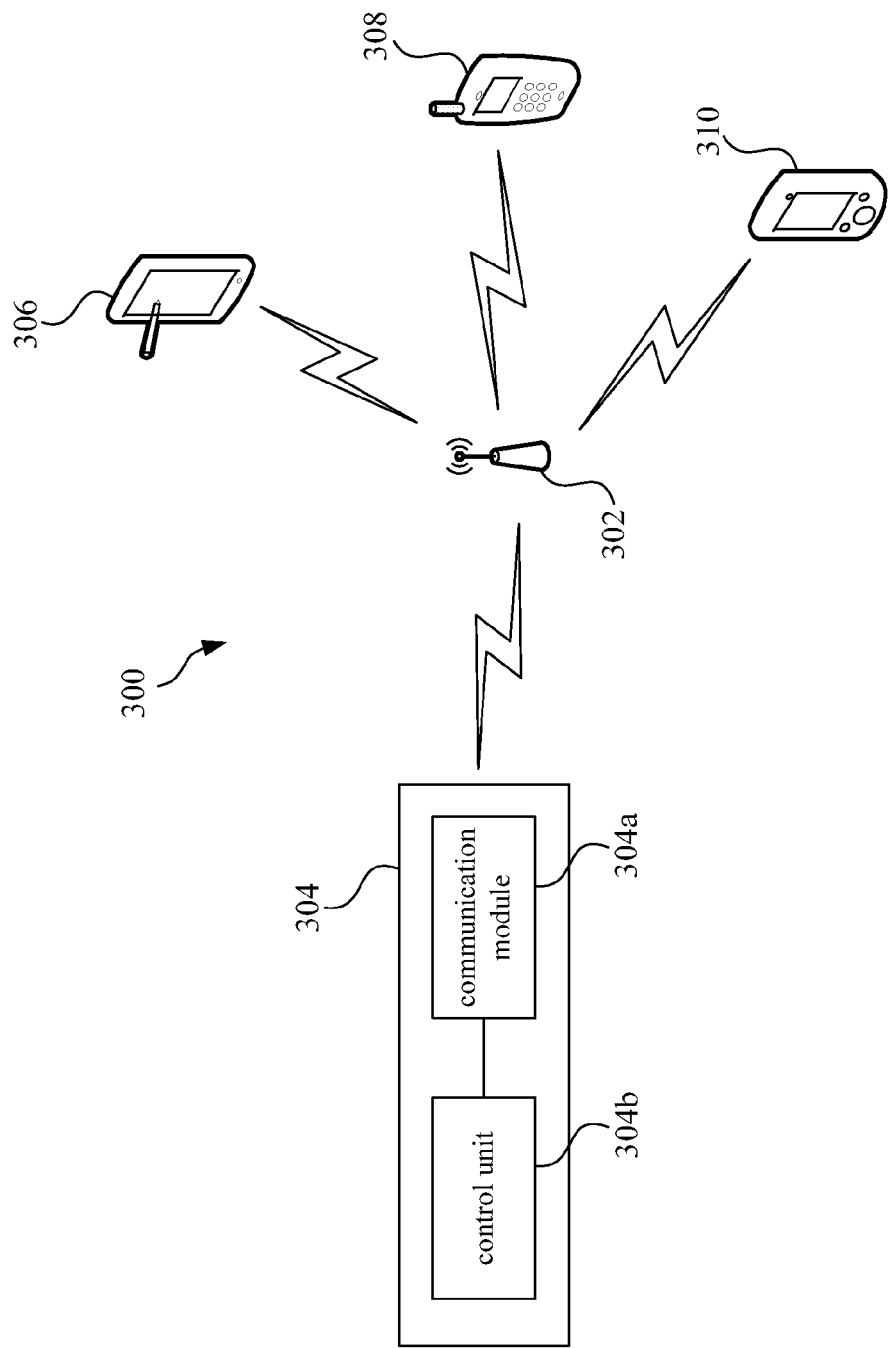
FIG. 2 is a schematic diagram illustrating a mobile communication device within a communication network structure.

Please refer to FIG. 2, which is a schematic diagram illustrating a mobile communication device 304 within a communication network structure 300. As shown in FIG. 2, the mobile communication device 304 includes a communication module 304a and a control unit 304b. The control unit 304b is coupled to the communication module 304a. In the embodiment, the mobile communication device 304 can be a cellar phone, a smart phone, a personal digital assistant, a tablet computer, an internet computer, a notebook computer, or any electronic apparatus capable of performing a mobile communication. The communication module 304a of the mobile communication device 304 is used for communicatively connecting to a communication server 302.

In the communication network structure 300 of the embodiment, the communication server 302 may not only form a communicative connection to the mobile communication device 304 but also form communicative connections to some other communication devices (e.g. a communication node 306, a communication node 308 and a communication node 310). Each of the communication devices can be a mobile communication device or a fixed communication device.

The mobile communication device 304 may exchange information with other communication devices under the communication network structure 300 through the communication server 302. As shown in FIG. 2, the communication server 302 is illustrated to be a wireless access point (AP) and the communication nodes are illustrated to be a tablet computer, a cellar phone and a smart phone for example, but the invention is not limited to this.

In practical applications, the mobile communication device 304 may activate the communication module 304a periodically to receive a one-to-one packet from the communication server 302. The one-to-one packet can be a Beacon packet between the communication server 302 and the mobile communication devices 304. In this embodiment, the communication server 302 is a wireless access point. The contents of the beacon packet include a service set identifier (SSID), a supportable transmission speed and a Media Access Control (MAC) address of the wireless access point (i.e. communication server 302). The mobile communication device 304 receives the Beacon packet from the communication server 302 for ensuring that the communication connection between the communication server 302 and the mobile communication devices 304 is existed and well functioned. When the mobile communication device 304 is switched to be connected to another different communication server, the network configuration of the mobile communication device 304 can be updated based on the mechanic of Beacon packet check.

Under the communication network structure 300, the mobile communication device 304 is not only communicatively connected to the communication server 302. The mobile communication device 304, the communication node 306, the communication node 308 and the communication node 310 may exchange some one-to-one packets or one-to-many packets between each others. The one-to-many packets may include a multicast packet or a broadcast packet.

In this embodiment, the control unit 304*b* of the mobile communication device 304 utilizes the communication module 304*a* to receive a one-to-one packet (e.g. Beacon packet) from the communication server 302 periodically and ignore a one-to-many packet on the communication server 302. In the embodiment, aforesaid one-to-many packet is generated by the communication node 306, the communication node 308 or the communication node 310. The mobile communication device 304 may ignore aforesaid one-to-many packet automatically, and the mobile communication device 304 may switch the communication module 304*a* into a standby mode without performing to receive the one-to-many packet. Accordingly, the power consumption of the mobile communication device 304 can be reduced, and the battery durability of the mobile communication device 304 can be prolonged.

Take a one-to-many packet in practical applications for example. Among aforesaid mobile communication device and communication nodes, Address Resolution Protocol (ARP) is usually adopted to transmit an ARP request packet between devices. Basically, the ARP request packet is one kind of one-to-many packets. In other words, the one-to-many packet ignored by the mobile communication device 304 can be an ARP request packet from other communication devices (e.g. communication nodes 306~310) connected with the communication server 302.

In traditional transmission mechanic, the mobile communication device and other communication devices transmit the ARP request packets to each others according to the Address Resolution Protocol. For example, the communication node 306 may generate a broadcasting ARP request packet (one-to-many packet). The broadcasting ARP request packet is broadcasted through the communication server 302 to any other devices (the mobile communication device 304, the communication node 308 and the communication node 310) under the same network. After receiving the ARP request packet, these devices may respond with an ARP response packet to the original requesting communication node. Accordingly, these devices may exchange the mapping relationships of their Internet protocol (IP) address and their Media Access Control (MAC) address so as to maintain the usability of communication connections between them.

Many devices under the communication network structure 300 take their turns to send the one-to-many packet (e.g. ARP request packet) and request for responding from other devices. After the Beacon packet is received by the mobile communication device 304 from the communication server 302, a traditional mobile communication device adopting a traditional routine will remain activating until the ARP connection is over-timed or the ARP packet generated is fully received. In the embodiment of the invention, the mobile communication device 304 will ignore the one-to-many packet (ARP packet) on the communication server 302. Besides, the control unit 304*b* of the mobile communication device 304 utilizes the communication module 304*a* to transmit an ARP response packet (one-to-many packet) to the communication server 302 periodically, and then the communication server 302 may forward the ARP response packet to other communication nodes 306~310. The ARP response packet can be a multicast packet transmitted to multiple targets among the communication nodes 306~310 or a broadcast packet transmitted to all of the communication nodes 306~310.

Figure 3:
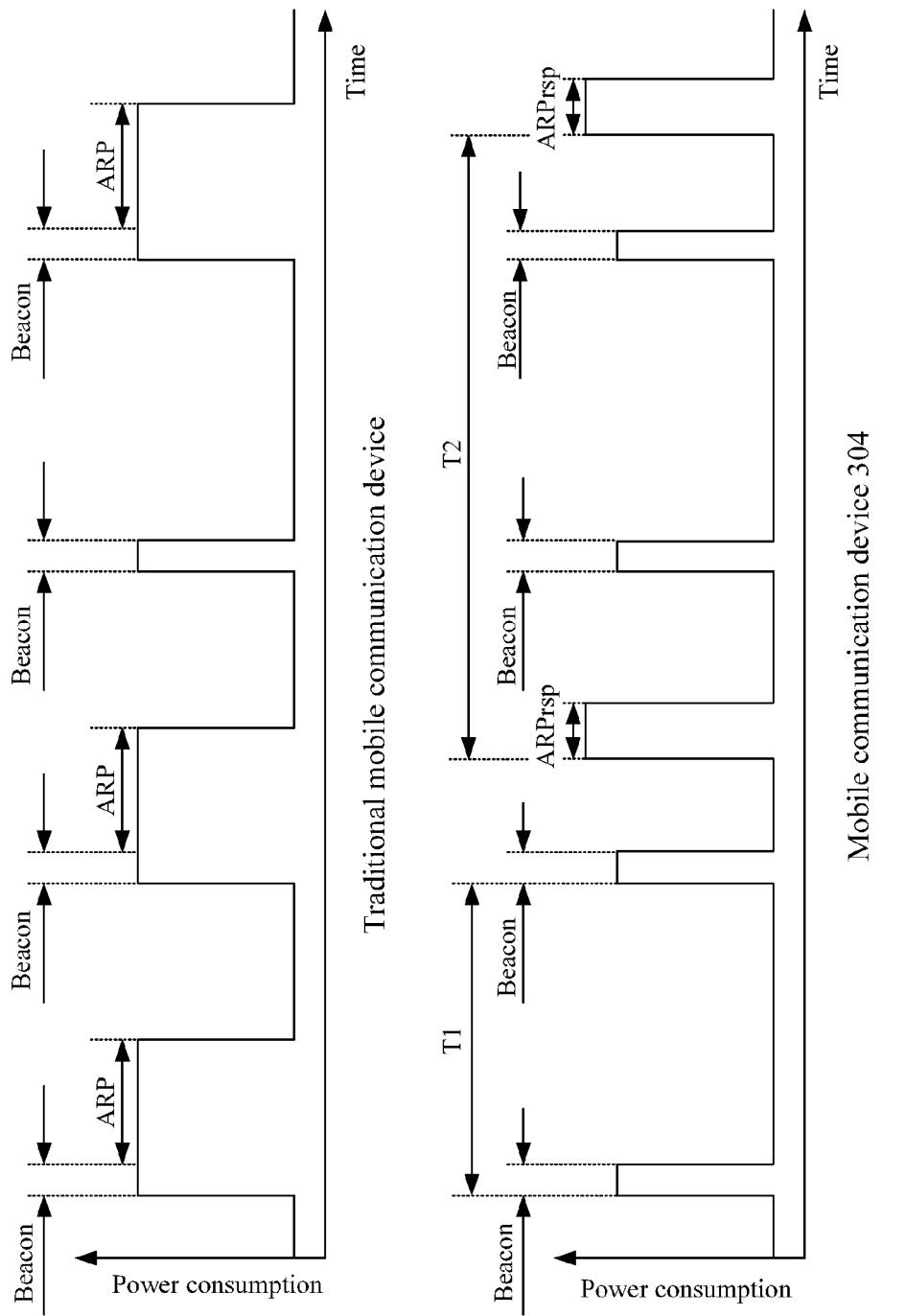
FIG. 3 is a timing diagram illustrating the power consumption relationship between a traditional mobile communication device and the mobile communication device according to the embodiment of the invention.

Please refer to FIG. 3, which is a timing diagram illustrating the power consumption relationship between a traditional mobile communication device and the mobile communication device 304 according to the embodiment of the invention.

Accordingly to the embodiment, the mobile communication device 304 receives the Beacon packet (as "Beacon" shown in FIG. 3) according to a first period T1, and the mobile communication device 304 transmits the ARP response packet (as "ARP response" shown in FIG. 3) to the communication server 302 according to a second period T2. The first period T1 and the second period T2 are not necessarily the same in the embodiment. In practical applications, the mobile communication device 304 does not need to transmit the ARP response packet too frequently. Therefore, the second period T2 can be longer than the first period T1. As the example in FIG. 3, the second period T2 is twice as long as the first period T1, but the invention is not limited to this. The proportion between the first and the second periods can be a fixed ratio or a variable ratio.

The mobile communication device 304 does not need to receive or wait the first one-to-many packet (e.g., the ARP request packet) from other device right after receiving each periodic beacon packet according to the first period T1 (FIG. 3). In the embodiment, the mobile communication device 304 may switch the communication module 304*a* into a standby mode without performing to receive the ARP request packet and transmit the ARP response packet only during the periodically allocated time interval marked as "ARPrsp" in FIG. 3 according to the second period T2. Since the periodically allocated interval for transmitting the ARP response packet is short and the second period T2 is larger than the first period T1, active time of the communication module 304*a* is shortened and hence the battery durability of the mobile communication device 304 is prolonged.

Please refer to FIG. 3. In a practical application, the communication module of the traditional mobile communication device has to be activated for 15~25 microseconds when there is an ARP broadcast, and it needs to be activated for 5~7 microseconds for receiving the Beacon packet when there is no ARP broadcast. The communication module of the mobile communication device 304 of the invention only has to be activated for 5~7 microseconds for receiving the Beacon packet, and the mobile communication device 304 transmits the ARP response packet according to a longer period, such as transmitting one ARP response packet per second.

Accordingly, the mobile communication device 304 may reduce its power consumption without affecting network connections by ignoring ARP request packets and transmitting ARP response packets periodically. In aforesaid embodiment, the one-to-many packet of the mobile communication device 304 is relative to the Address Resolution Protocol (ARP) for demonstration. However, the one-to-many packet disclosed in the invention is not limited to this, and the one-to-many packet may include any equivalent one-to-many communicative packet with similar features.

Figure 4:
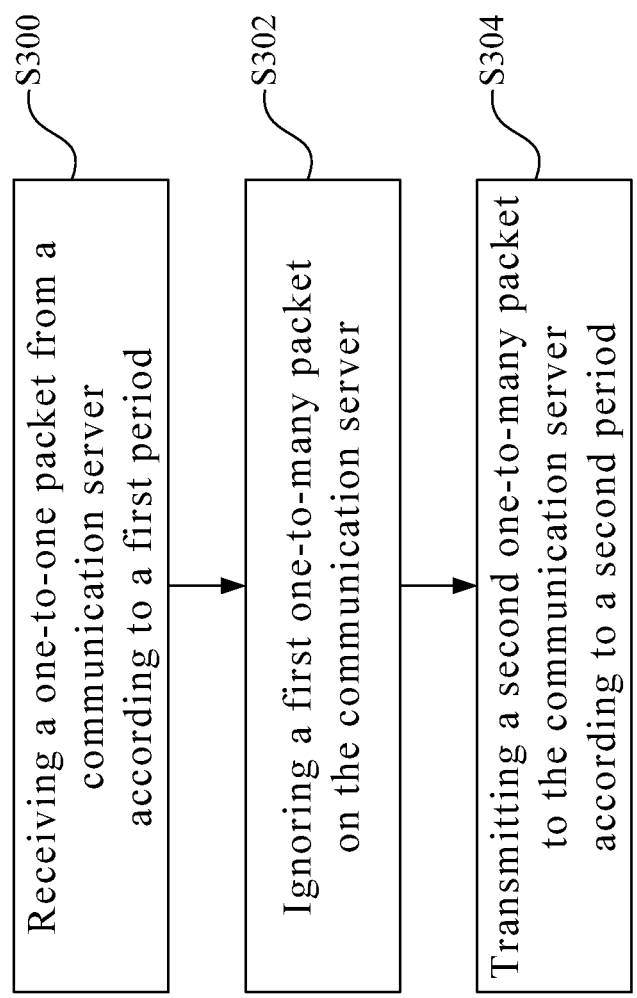
FIG. 4 is a flow chart illustrating a communicative transmission method according to an embodiment of the invention.

Please refer to FIG. 4, which is a flow chart illustrating a communicative transmission method according to an embodiment of the invention. The communicative transmission method is suitable for being used by a mobile communication device, which is connecting to a communication server. The mobile communication device is communicatively connected to the communication server. Besides, the communication server may further form some communicative connections to some communication devices. The communication network structure including the communication server, the mobile communication device and other communication devices can be referred to the contents and figures (e.g. FIG. 2) of aforesaid embodiments in the invention, and it is not to be repeated here.

As shown in FIG. 4, step S300 of the communicative transmission method is performed, such that the mobile communication device receives a one-to-one packet from the communication server according to a first period. In this embodiment, the communication server can be a wireless access point, and the one-to-one packet may include a beacon packet corresponding to the wireless access point. Contents of the beacon packet may include a service set identifier (SSID), a supportable transmission speed and a Media Access Control (MAC) address of the wireless access point.

Afterward, step S302 of the communicative transmission method is performed, such that the mobile communication device ignores a first one-to-many packet on the communication server. In the embodiment, the first one-to-many packet may come from another communication device communicatively connected with the communication server, and the first one-to-many packet can be forwarded by the communication server to the mobile communication device. The first one-to-many packet can be a multicast packet or a broadcast packet. In the embodiment, the first one-to-many packet may include an Address Resolution Protocol (ARP) request packet.

Afterward, step S304 of the communicative transmission method is performed, such that the mobile communication device transmits a second one-to-many packet to the communication server according to a second period. The second one-to-many packet can be a multicast packet or a broadcast packet. In the embodiment, the second one-to-many packet may include an Address Resolution Protocol (ARP) response packet. Through forwarding operation on the communication server, the second one-to-many packet can be transmitted to another communication device communicatively connected with the communication server. Besides, the second period for performing S304 can be longer than the first period for performing S302.

As mentioned above, the mobile communication device in the invention periodically receives one-to-one packets from the communication server and ignores one-to-many packets (e.g. Address Resolution Protocol request packets). Besides, the mobile communication device may periodically transmit one-to-many packets (e.g. Address Resolution Protocol response packets) to the communication server. Because the mobile communication device in this case does not need to receive or wait the one-to-many packets from other devices, the active time of the communication module in the mobile communication device can be shorten, so as to save energy and prolong the battery durability of the mobile communication device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A mobile communication device, comprising:
a communication module used for communicatively connecting to a communication server; and
a control unit coupled with the communication module, the control unit utilizing the communication module to periodically receive a beacon packet between the communication server and the mobile communication device according to a first period, ignore an Address Resolution Protocol (ARP) request packet from another mobile communication device via the communication server, the control unit utilizing the communication module to periodically transmit an Address Resolution Protocol (ARP) response packet to the communication server according to a second period.

2. The mobile communication device of claim 1, wherein the ARP request packet is a multicast packet or a broadcast packet.

3. The mobile communication device of claim 2, wherein the ARP request packet is from another communication device communicatively connected with the communication server.

4. The mobile communication device of claim 1, wherein the ARP response packet is a multicast packet or a broadcast packet.

5. The mobile communication device of claim 1, wherein the mobile communication device transmits the ARP response packet via forwarding operation on the communication server to another communication device communicatively connected with the communication server.

6. The mobile communication device of claim 1, wherein the communication server is a wireless access point, and the beacon packet corresponds to the wireless access point.

7. The mobile communication device of claim 6, wherein contents of the beacon packet comprise a service set identifier (SSID), a supportable transmission speed and a Media Access Control (MAC) address of the wireless access point.

8. The mobile communication device of claim 1, wherein the second period is longer than the first period.

9. A communicative transmission method, the communicative transmission method being used by a mobile communication device connecting with a communication server, the communicative transmission method comprising steps of:
periodically receiving a beacon packet from the communication server according to a first period;
ignoring an Address Resolution Protocol (ARP) request packet sent from another mobile communication device via the communication server; and
periodically transmitting an Address Resolution Protocol (ARP) response packet to the communication server according to a second period.

10. The communicative transmission method of claim 9, wherein the ARP request packet is a multicast packet or a broadcast packet.

11. The communicative transmission method of claim 10, wherein the ARP request packet is from another communication device communicatively connected with the communication server.

12. The communicative transmission method of claim 9, wherein the ARP response packet is a multicast packet or a broadcast packet.

13. The communicative transmission method of claim 9, further comprising a step of:

transmitting the ARP response packet via forwarding operation on the communication server to another communication device communicatively connected with the communication server.

14. The communicative transmission method of claim 9, wherein the communication server is a wireless access point, and the beacon packet corresponds to the wireless access point.

15. The communicative transmission method of claim 14, wherein contents of the beacon packet comprise a service set identifier (SSID), a supportable transmission speed and a Media Access Control (MAC) address of the wireless access point.

16. The communicative transmission method of claim 9, wherein the second period is longer than the first period.

* * * * *